(12) United States Patent
Richard

(10) Patent No.: US 7,469,878 B1
(45) Date of Patent: Dec. 30, 2008

(54) MAGNETOSTRICTIVE VALVE ASSEMBLY

(75) Inventor: James A. Richard, Grant, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 46 days.

(21) Appl. No.: 11/518,733

(22) Filed: Sep. 1, 2006

(51) Int. Cl.
*F16K 31/02* (2006.01)
(52) U.S. Cl. .................... 251/129.06; 310/26
(58) Field of Classification Search .......... 251/129.01, 251/129.06; 310/15, 26
See application file for complete search history.

(56) References Cited

U.S. PATENT DOCUMENTS

| | | | |
|---|---|---|---|
| 4,158,368 A | 6/1979 | Clark | |
| 4,726,741 A * | 2/1988 | Cusack | 417/322 |
| 4,804,314 A | 2/1989 | Cusack | |
| 4,815,946 A * | 3/1989 | Cusack | 417/322 |
| 5,375,811 A | 12/1994 | Reinicke | |
| 5,501,425 A | 3/1996 | Reinicke et al. | |
| 5,868,375 A | 2/1999 | Reinicke et al. | |
| 6,026,847 A | 2/2000 | Reinicke et al. | |
| 6,279,842 B1 | 8/2001 | Spain | |
| 6,307,286 B1 | 10/2001 | Yamazaki et al. | |
| 6,364,221 B1 | 4/2002 | Czimmek | |
| 6,405,942 B1 * | 6/2002 | Ruehle et al. | 239/102.2 |
| 6,561,218 B2 | 5/2003 | Mudd | |
| 6,702,250 B2 | 3/2004 | Czimmek | |

* cited by examiner

*Primary Examiner*—John K Fristoe, Jr.
(74) *Attorney, Agent, or Firm*—James J. McGroary; Peter J. Van Bergen

(57) ABSTRACT

A magnetostrictive valve assembly includes a housing that defines a passage with a seat being formed therein. A magnetically-biased and axially-compressed magnetostrictive assembly slidingly fitted in the passage is configured as a hollow and open-ended conduit adapted to support a flow of a fluid therethrough. Current-carrying coil(s) disposed about the passage in the region of the magnetostrictive assembly generate a magnetic field in the passage when current flows through the coil(s). A hollow valve body with side ports is coupled on one end thereof to an axial end of the magnetostrictive assembly. The other end of the valve body is designed to seal with the seat formed in the housing's passage when brought into contact therewith.

20 Claims, 1 Drawing Sheet

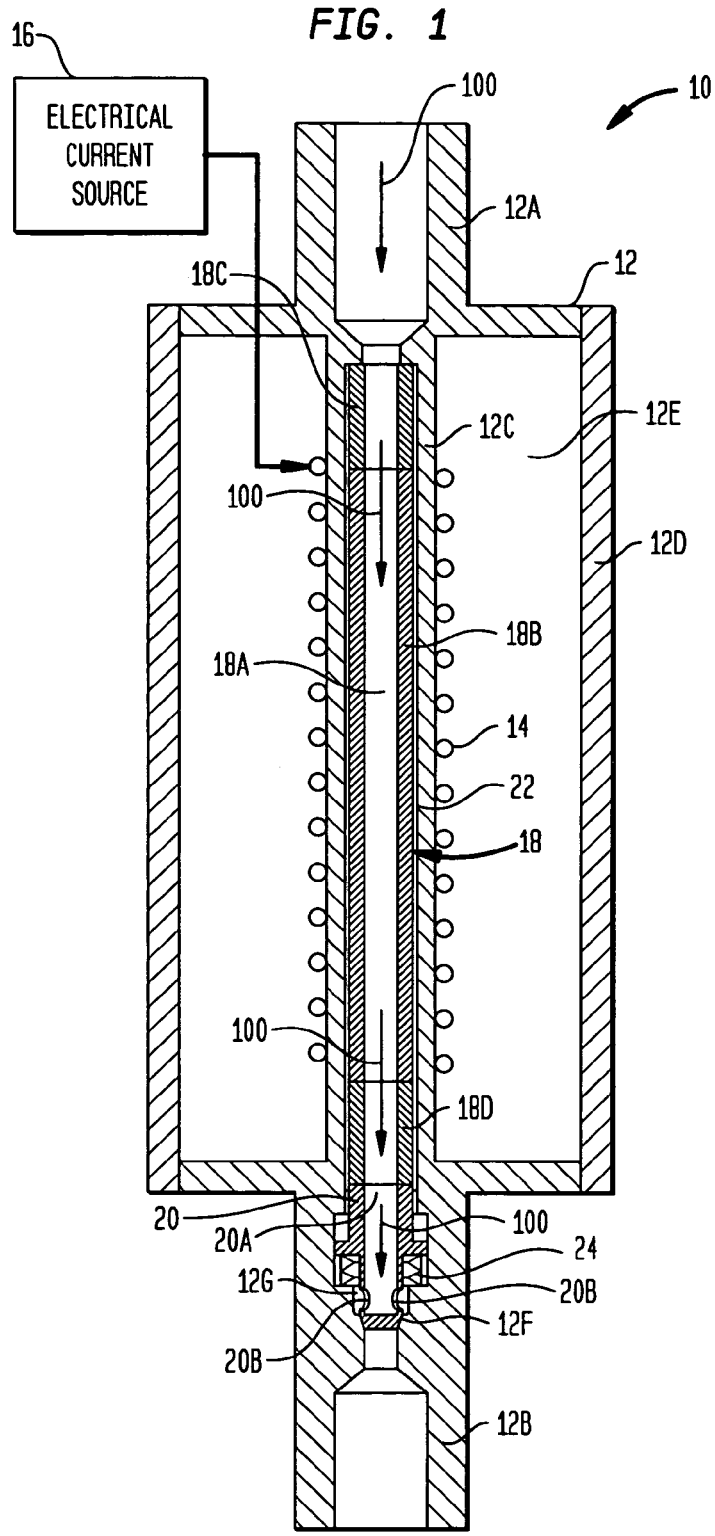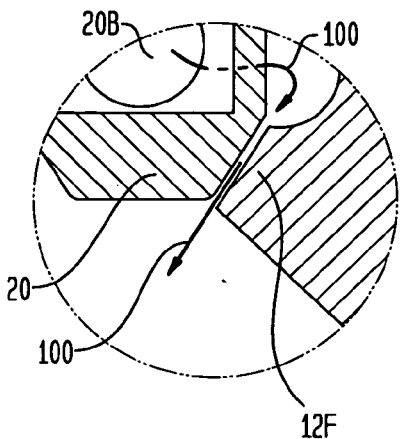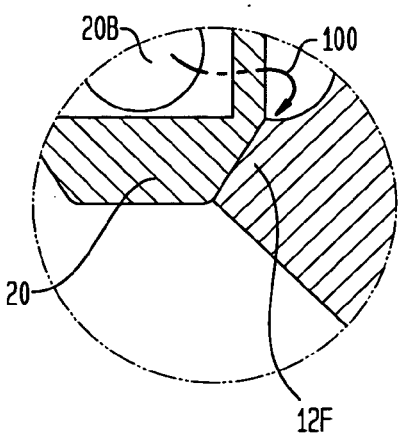

MAGNETOSTRICTIVE VALVE ASSEMBLY

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to a valve assembly. More specifically, the invention is a magnetostrictive valve assembly.

2. Description of the Related Art

Aerospace rocket engines are typically supplied with fuel through one or more valves. These valves are generally single flow-through elements that are generally driven by a prime mover that is mechanical, electromechanical, or pneumatic in nature. Very often, the response times of these types of valves are not optimal. Furthermore, these types of valves all require one or more penetrations through a barrier/interface between the fuel and the valve element's prime mover so that the prime mover can be physically coupled to the valve element. However, such penetrations are the source of leaks and/or failures. Thus, these prior art valves are generally considered too unreliable to be used by themselves. Accordingly, fuel system designers frequently design either single-element valve systems requiring extensive testing and quality control, or design redundant or parallel-path fuel delivery systems. In either case, the overall system cost is increased. Further, in the case of parallel-path systems, the overall system's size and weight are negatively impacted.

SUMMARY OF THE INVENTION

Accordingly, it is an object of the present invention to provide a reliable valve assembly.

Another object of the present invention is to provide a valve assembly that has a quick response.

Still another object of the present invention is to provide a valve assembly in which the valve's prime mover need not be physically coupled to the valve's element.

Other objects and advantages of the present invention will become more obvious hereinafter in the specification and drawings.

In accordance with the present invention, a magnetostrictive valve assembly is provided. A housing defines a passage therethrough with a seat being formed therein. A magnetically-biased magnetostrictive assembly is slidingly fitted in the passage and retained therein. The magnetostrictive assembly is configured as a hollow and open-ended conduit adapted to support a flow of a fluid therethrough. Current-carrying means such as a coil is disposed about the passage in the region of the magnetostrictive assembly. A magnetic field is generated in the coil when current flows therethrough. A hollow valve body is coupled on one end thereof to an axial end of the magnetostrictive assembly. Fluid flowing through the magnetostrictive assembly enters one end of the valve body. The other end of the valve body is designed to seal with the seat formed in the housing's passage when brought into contact therewith. The valve body further has at least one opening formed through its periphery between the ends thereof through which the fluid can flow when entering the valve body. An axial compression force is applied at all times to the magnetostrictive assembly.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a cross-sectional view of a magnetostrictive valve assembly in accordance with an embodiment of the present invention;

FIG. 2 is an enlarged view of a portion of the valve assembly illustrating the valve in its open position; and FIG. 3 is an enlarged view of a portion of the valve assembly illustrating the valve in its closed position.

DESCRIPTION OF THE PREFERRED EMBODIMENT(S)

Referring now to the drawings, and more particularly to FIG. 1, a cross-sectional view of a magnetostrictive valve assembly in accordance with the present invention is shown and is referenced generally by numeral 10. In the ensuing description, the novel elements of valve assembly 10 will be set forth without focusing on particular construction details as such construction details are considered to be understood in the art. That is, it is to be understood that these novel elements can be implemented in a variety of valve assembly constructions without departing from the scope of the present invention. Furthermore, valve assembly 10 can be used to control the flow of a variety of fluids (e.g., fuel, water, medically-related fluids, body fluids, etc.) so that the particular applications of valve assembly 10 are not to be considered limitations thereof.

In the illustrated embodiment, valve assembly 10 has a rigid housing or body 12 defined by a fluid inlet 12A, a fluid outlet 12B, a passage 12C providing fluid communication between inlet 12A and outlet 12B, and an outer body 12D that defines an annular space 12E about passage 12C. An annular ridge or seat 12F is defined at one end of passage 12C on the inside thereof. The particular construction of body 12 or choice of materials for body 12 are not limitations of the present invention provided that inlet 12A, passage 12C, and outlet 12B define a fluid flow path through body 12.

Disposed in annular space 12E between passage 12C and outer body 12D is one or more electrical current-carrying coils 14. More specifically, coil(s) 14 is wrapped about the outside of passage 12C. An electrical current source 16 is coupled to coil(s) 14. Source 16 could be located outside of body 12 (as shown) or within annular space 12E. If located within body 12, activation/deactivation of source 16 could be accomplished in a wireless fashion.

The activation/deactivation of source 16 provides for the closing/opening of valve assembly 10. In general, the closing of valve assembly 10 occurs when a magnetostrictive assembly 18 (disposed in passage 12C) elongates while the opening of valve assembly 10 occurs when magnetostrictive assembly 18 contracts. In accordance with the present invention, magnetostrictive assembly 18 defines an open-ended conduit that fits in passage 12C such that axial elongation and contraction thereof are supported by passage 12C. Accordingly, magnetostrictive assembly 18 slidingly fits in passage 12C and typically is defined by constant inside and outside diameters throughout the assembly.

A fluid (represented by arrows 100) flows through inlet 12A and into the hollow central portion 18A of magnetostrictive assembly 18. Coupled to one end of magnetostrictive assembly 18 adjacent seat 12E is a valve body 20 having a hollow core 20A aligned with hollow central portion 18A of magnetostrictive assembly 18. Hollow core 20A is in communication with one or more valve ports 20B formed in the periphery of valve body 20. When magnetostrictive assembly 18 is contracted (i.e., no current is flowing through coil(s) 14) the outboard end of valve body 20 is spaced apart from annular seat 12F as illustrated in FIG. 2. In this position, fluid 100 flows through hollow core 20A, out ports 20B, and past annular seat 12E and into outlet 12B. However, when magnetostrictive assembly 18 is elongated (i.e., current is flowing through coil(s) 14), the outboard end of valve body 20 forms a seal with annular seat 12F as illustrated in FIG. 3 thereby preventing the flow of fluid 100 past annular seat 12F.

Magnetostrictive assembly 18 has a hollow tube 18B (e.g., a cylindrical tube) of magnetostrictive material that forms a sliding fit within passage 12C. To facilitate this type of fit, a non-stick material 22 (e.g., TEFLON or other suitable non-stick material) can be disposed between magnetostrictive assembly 18 and passage 12C. Non-stick material 22 can also take the form of a coating on the inside walls of passage 12C. The magnetostrictive material comprising tube 18B is any suitable type of such material that undergoes changes in axial length (e.g., lengthens) when disposed in a magnetic field. In the present invention, the magnetic field is generated when current flows through coil(s) 14. For aerospace applications where cryogenic temperatures are encountered, suitable magnetostrictive materials include, but are not limited to, terbium-based compounds such as TERFENOL-D which is commercially available from Etrema Products, Inc.

To improve the response times associated with the elongation/contraction of tube 18B and to make the amount of elongation/contraction repeatable and constant, the present invention magnetically biases the magnetostrictive material and keeps it under axial compression at all times. With respect to the magnetic biasing of tube 18B, the magnetostrictive assembly of the present invention utilizes tubular permanent magnets 18C and 18D disposed at either axial end of tube 18B. Magnetic forces generated by magnets 18C and 18D will generally be sufficient to keep the magnets in place provided body 12 is made from a non-magnetic material. However, magnets 18C and 18D could also be bonded to the axial ends of tube 18B. Magnets 18C and 18D align the magnetostrictive material's magnetic moments in the axial direction of tube 18B. By magnetically biasing tube 18B in this way, two advantages are achieved. First, elongation of tube 18B will be maximized when tube 18B is immersed in the magnetic field generated by coil(s) 14 as current flows therethrough. Second, the magnetic biasing reduces the amount of magnetic flux that must be produced by coil(s) 14 thereby increasing the valve's overall efficiency.

On their own, magnetostrictive materials do not typically elongate and contract at the same rate. However, by keeping magnetostrictive assembly 18 under axial compression at all times, the difference between the rate of elongation and the rate of contraction of tube 18B is reduced enough that the two rates can be considered to be approximately the same rate. In the illustrated embodiment, this constant compressive force is achieved by means of a spring assembly 24 (e.g., a stack of one or more Belleville washers) that is disposed and captured between valve body 20 and an annular ridge 12G formed in body 20.

The advantages of the present invention are numerous. The valve's prime mover (i.e., energized coil(s) 14) need not be physically coupled to the valve's element (i.e., magnetostrictive assembly 18 and valve body 20) thereby eliminating issues of leakage and failure associated with penetrations through the fluid-carrying portion of the valve assembly. Further, by magnetically biasing the magnetostrictive assembly, maximum efficiency is achieved for a given assembly. Still further, by axially compressing the magnetostrictive assembly at all times, the difference between elongation and contraction rates thereof is greatly reduced so that flow control is easier to achieve.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetostrictive valve assembly, comprising:
    a housing defining a passage therethrough with said passage having a seat formed therein;
    a magnetically-biased magnetostrictive assembly slidingly fitted in said passage and retained therein, said magnetostrictive assembly configured as a hollow and open-ended conduit adapted to support a flow of a fluid therethrough;
    current-carrying means disposed about said passage in the region of said magnetostrictive assembly;
    a hollow valve body coupled on one end thereof to an axial end of said magnetostrictive assembly wherein the fluid enters said valve body after exiting said magnetostrictive assembly, said valve body having another end thereof designed to seal with said seat when brought into contact therewith, said valve body further having at least one opening formed through its periphery between said ends thereof through which the fluid can flow when entering the valve body; and
    means mounted in said housing for continually applying an axial compression force to said magnetostrictive assembly.

2. A magnetostrictive valve assembly as in claim 1 wherein said seat is annularly formed in said passage.

3. A magnetostrictive valve assembly as in claim 1 wherein said magnetostrictive assembly comprises:
    a tube of magnetostrictive material; and
    first and second tubular magnets disposed at either axial end of said cylinder of magnetostrictive material.

4. A magnetostrictive valve assembly as in claim 3 wherein each of said first and second tubular magnets is a permanent magnet.

5. A magnetostrictive valve assembly as in claim 3 wherein each of (i) said tube of magnetostrictive material, and (ii) said first and second tubular magnets, have identical inside diameters and identical outside diameters.

6. A magnetostrictive valve assembly as in claim 1 wherein said magnetostrictive material comprises a terbium-based compound.

7. A magnetostrictive valve assembly as in claim 1 further comprising a non-stick material disposed between said passage and said magnetostrictive assembly.

8. A magnetostrictive valve assembly as in claim 1 wherein said current-carrying means comprises at least one coil wrapped about a region of said housing defining said passage.

9. A magnetostrictive valve assembly as in claim 1 wherein said means for continually applying an axial compression force comprises a spring disposed between said valve body and said housing.

10. A magnetostrictive valve assembly as in claim 9 wherein said spring comprises at least one Belleville washer.

11. A magnetostrictive valve assembly, comprising:
a housing defining a passage therethrough with said passage having an annular seat formed therein;
a conduit assembly retained in said passage to one side of said annular seat, said conduit assembly having a hollow cylinder of magnetostrictive material with first and second hollow cylindrical magnets being disposed at either axial end of said cylinder of magnetostrictive material;
at least one electrically-conductive coil wrapped about said housing in the region of said magnetostrictive material;
a valve body for supporting fluid flow therethrough, said valve body coupled on one end thereof to an axial end of said conduit assembly, said valve body having another end thereof positioned adjacent said annular seat and designed to form a seal therewith when pressed thereagainst, said valve body further having at least one opening formed through its periphery between said ends thereof; and
a spring mounted in said housing for continually applying an axial compression force to said conduit assembly.

12. A magnetostrictive valve assembly as in claim 11 wherein each of said first and second cylindrical magnets is a permanent magnet.

13. A magnetostrictive valve assembly as in claim 11 wherein each of (i) said cylinder of magnetostrictive material, and (ii) said first and second cylindrical magnets, have identical inside diameters and identical outside diameters.

14. A magnetostrictive valve assembly as in claim 11 wherein said magnetostrictive material comprises a terbium-based compound.

15. A magnetostrictive valve assembly as in claim 11 further comprising a non-stick material disposed between said conduit assembly and a portion of said housing defining said passage.

16. A magnetostrictive valve assembly as in claim 11 wherein said spring comprises at least one Belleville washer.

17. A magnetostrictive valve assembly, comprising:
a non-magnetic housing defining a passage therethrough with said passage having an annular seat formed therein;
a constant-diameter conduit assembly retained in said passage to one side of said annular seat, said conduit assembly having a hollow cylinder of magnetostrictive material with first and second hollow cylindrical permanent magnets being disposed at either axial end of said cylinder of magnetostrictive material;
at least one electrically-conductive coil wrapped about said housing in the region of said magnetostrictive material;
an electric current source coupled to said coil for supplying electric current thereto;
a valve body for supporting fluid flow therethrough, said valve body coupled on one end thereof to an axial end of said conduit assembly, said valve body having another end thereof positioned adjacent said annular seat and designed to form a seal therewith when pressed thereagainst, said valve body further having at least one opening formed through its periphery between said ends thereof; and
a spring mounted in said housing for continually applying an axial compression force to said conduit assembly.

18. A magnetostrictive valve assembly as in claim 17 wherein said magnetostrictive material comprises a terbium-based compound.

19. A magnetostrictive valve assembly as in claim 17 further comprising a non-stick material disposed between said conduit assembly and a portion of said housing defining said passage.

20. A magnetostrictive valve assembly as in claim 17 wherein said spring comprises at least one Belleville washer.

* * * * *